United States Patent
Lee

(10) Patent No.: US 11,645,876 B2
(45) Date of Patent: May 9, 2023

(54) SYSTEM AND METHOD FOR PROVIDING ACTIVE SERVICES BASED ON BIG DATA USING REMOTE START DEVICE OF VEHICLE

(71) Applicant: GARIN SYSTEM Co., Ltd., Incheon (KR)

(72) Inventor: Yun Sub Lee, Incheon (KR)

(73) Assignee: GARIN SYSTEM Co., Ltd., Namdong-gu Incheon (KR)

(*) Notice: Subject to any disclaimer, the term of this patent is extended or adjusted under 35 U.S.C. 154(b) by 203 days.

(21) Appl. No.: 17/325,140

(22) Filed: May 19, 2021

(65) Prior Publication Data

US 2022/0148343 A1    May 12, 2022

(30) Foreign Application Priority Data

Nov. 12, 2020    (KR) .................... 10-2020-0150848

(51) Int. Cl.
| | | |
|---|---|---|
| G07C 5/00 | (2006.01) | |
| B60R 25/20 | (2013.01) | |
| G06N 5/02 | (2023.01) | |
| G07C 5/06 | (2006.01) | |

(52) U.S. Cl.
CPC ............ *G07C 5/008* (2013.01); *B60R 25/209* (2013.01); *G06N 5/02* (2013.01); *G07C 5/06* (2013.01)

(58) Field of Classification Search
CPC ........ G07C 5/008; G07C 5/06; B60R 25/209; G06N 5/02

USPC ......................................................... 340/439
See application file for complete search history.

(56) References Cited

U.S. PATENT DOCUMENTS

| | | | |
|---|---|---|---|
| 9,646,428 B1 | 5/2017 | Konrardy et al. | |
| 9,842,448 B1* | 12/2017 | Lickfelt | G07C 9/00896 |
| 2011/0224841 A1* | 9/2011 | Profitt-Brown | G07C 5/008 |
| | | | 701/2 |
| 2013/0151132 A1* | 6/2013 | Harumoto | F02N 11/0807 |
| | | | 701/113 |
| 2015/0129192 A1* | 5/2015 | Boss | B60H 1/00878 |
| | | | 165/223 |
| 2016/0009295 A1* | 1/2016 | Chun | A61B 5/6893 |
| | | | 701/32.9 |
| 2016/0101729 A1* | 4/2016 | Burke | B60W 40/08 |
| | | | 701/36 |
| 2017/0132934 A1* | 5/2017 | Kentley | G08G 1/202 |
| 2017/0249792 A1* | 8/2017 | Gen | B60R 25/01 |

(Continued)

*Primary Examiner* — Kerri L Mcnally
*Assistant Examiner* — Thang D Tran

(57) ABSTRACT

Disclosed is a method of providing active services based on big data using a remote start device of a vehicle. The method includes the steps of: collecting information related to the vehicle and a driver; deriving a behavior prediction value for predicting driver's behavior based on the collected information; operating an active service determination unit when the derived behavior prediction value meets a preset condition; determining, by the active service determination unit, proposal of an active service to the driver based on the collected vehicle-related information; determining a type of the active service and a time of providing the active service; transmitting proposal of the determined active service to a driver terminal to be displayed; and starting execution of the determined active service according to a change in the state of the driver terminal.

6 Claims, 5 Drawing Sheets

(56) References Cited

U.S. PATENT DOCUMENTS

| | | | | |
|---|---|---|---|---|
| 2017/0255895 A1* | 9/2017 | Kozumi | ............. | E02F 9/264 |
| 2018/0065597 A1* | 3/2018 | Kim | ............. | G07C 9/00309 |
| 2018/0074490 A1* | 3/2018 | Park | ............. | G06Q 20/3224 |
| 2018/0290622 A1* | 10/2018 | Mori | ............. | H04M 11/00 |
| 2019/0028443 A1* | 1/2019 | Chin | ............. | G07C 9/00571 |
| 2019/0052522 A1* | 2/2019 | Makkiya | ............. | H04L 41/069 |
| 2019/0375357 A1* | 12/2019 | Mezaael | ............. | B60R 21/01 |
| 2020/0254875 A1* | 8/2020 | Strandberg | ............. | G06F 21/44 |
| 2022/0250583 A1* | 8/2022 | Garg | ............. | B60R 25/102 |

\* cited by examiner

SYSTEM AND METHOD FOR PROVIDING ACTIVE SERVICES BASED ON BIG DATA USING REMOTE START DEVICE OF VEHICLE

CROSS-REFERENCE TO PRIOR APPLICATIONS

This application claims priority of Korean Patent Application No. 10-2020-0150848, filed on Nov. 12, 2020, which is hereby incorporated by reference in its entirety.

BACKGROUND OF THE INVENTION

Field of the Invention

The present invention relates to a system and method for providing active services based on big data using a remote start device of a vehicle, and more specifically, to a system and method for actively providing vehicle-related services to a driver through a driver terminal connected to a vehicle by collecting information related to the vehicle and the driver using a remote start device provided in the vehicle and combining the collected information with big data.

Background of the Related Art

Conventionally, there is inconvenience in that functions such as locking and unlocking vehicle doors, starting an engine, and operating an air conditioner can be controlled only when a driver is in a vehicle. However, as a remote control function is frequently mounted on the vehicle recently, some functions such as locking and unlocking vehicle doors and starting an engine can be controlled remotely by the driver. Remote control of a vehicle like this is widely used by improving the convenience such as preheating the engine in a way of remotely starting the engine before the driver rides the vehicle.

However, since such a conventional remote control function of a vehicle is not actively provided to a driver, the driver should determine the necessity by himself or herself and manually activate the function, and therefore, there is a limit in that when the driver does not think of operating the function or forgets the operation by mistake, the function cannot be used.

SUMMARY OF THE INVENTION

Therefore, the present invention has been made in view of the above problems, and it is an object of the present invention to actively provide a vehicle function control service to a driver based on the position of the driver and the vehicle, other state information, and prediction of a driver's behavior, using a driver's smart device connected to the vehicle.

To accomplish the above object, according to one aspect of the present invention, there is provided a method of providing active services based on big data using a remote start device of a vehicle according to the present invention may include the steps of: collecting information related to the vehicle and a driver; deriving a behavior prediction value for predicting driver's behavior based on the collected information; operating an active service determination unit that determines whether or not to propose an active service when the derived behavior prediction value meets a preset condition; determining, by the active service determination unit, proposal of an active service to the driver based on the collected vehicle-related information; determining a type of the proposed active service; determining a time of providing the proposed active service; transmitting proposal of the determined active service to a driver terminal to be displayed; and starting execution of the determined active service according to a change in a state of the driver terminal.

Here, at the step of deriving a behavior prediction value, the behavior prediction value may be derived by matching information on the driver's behavior pattern in each time slot with information on the driver's behavior pattern at each location.

In addition, at the step of determining, by the active service determination unit, proposal of an active service to the driver based on the collected vehicle-related information, the collected vehicle-related information may include current state information of the vehicle, current location information of the vehicle, and environmental information at the current location of the vehicle.

In addition, at the step of determining a time of providing the proposed active service, a time for providing the proposed active service may be determined by combining a difference between the collected current state information of the vehicle and a target state information of the vehicle with information on the distance between the current location of the driver and the vehicle.

In addition, at the step of starting execution of the determined active service according to a change in a state of the driver terminal, the state change may include a change in the pressure value of a pressure sensor of the driver terminal and a change in the strength value of wireless signal.

Meanwhile, a system for providing active services based on big data using a remote start device of a vehicle according to the present invention may include: a remote control unit connected to a vehicle internal communication network to collect and transmit vehicle-related information and perform remote control of the vehicle; a driver terminal for collecting driver-related information and displaying proposal of an active service; and a server unit for receiving the information from the remote control unit and the driver terminal and proposing an active service to the driver based on the information, and the server unit may include: a behavior prediction unit for deriving a behavior prediction value for predicting driver's behavior based on the information collected from the user terminal; and an active service determination unit that is executed when the behavior prediction value derived by the behavior prediction unit satisfies a preset condition to determine an active service.

DETAILED DESCRIPTION OF THE PREFERRED EMBODIMENT

Figure 1:
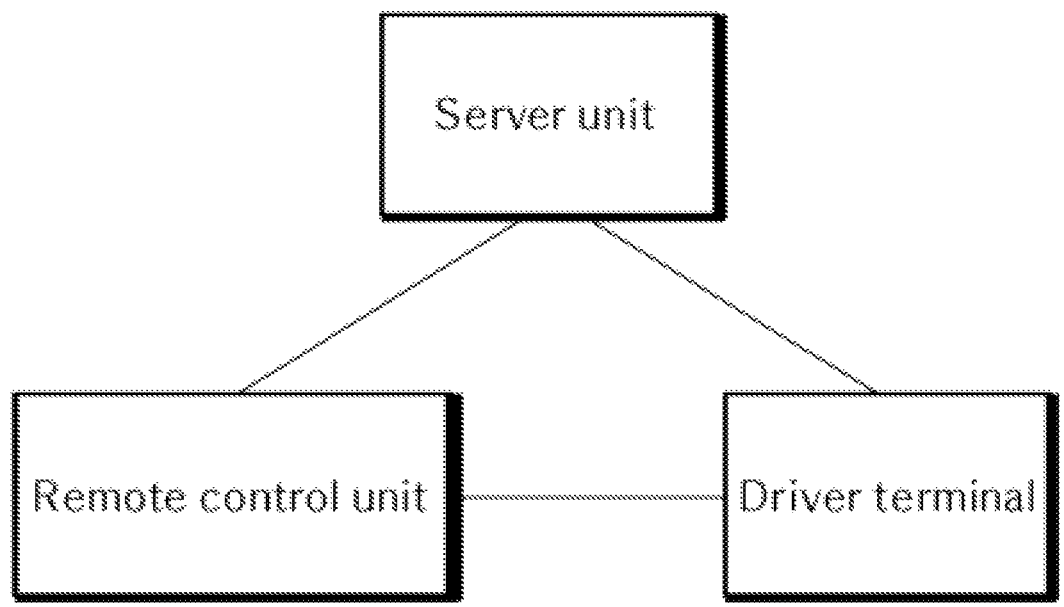
FIG. 1 is a block diagram showing the configuration of a system for providing active services based on big data using a remote start device of a vehicle according to the present invention.

Hereinafter, the present invention will be described in detail with reference to preferred embodiments of the present invention and the accompanying drawings, and it will be described on the premise that the same reference numerals refer to the same components.

In the detailed description or claims of the present invention, when any one component "includes" another component, it is not construed as being limited to only the component unless otherwise stated, and it should be understood that the component may further include other components.

Hereinafter, an example implementing a system and method for providing active services based on big data using a remote start device of a vehicle will be described through a specific embodiment.

The present invention relates to a system and method for actively providing vehicle-related services to a driver through a driver terminal connected to a vehicle by collecting information related to the vehicle and the driver using a remote start device provided in the vehicle and combining the collected information with big data, and FIG. 1 is a view schematically showing the configuration of the system according to the present invention.

The system for providing active services according to the present invention is largely configured of a remote control unit, a server unit, and a driver terminal.

The remote control unit is connected to a vehicle internal communication network and transmits various information on the vehicle to the server unit through a communication module provided in the remote control unit.

The remote control unit may be a third party module that can be separately mounted inside the vehicle.

Figure 2:
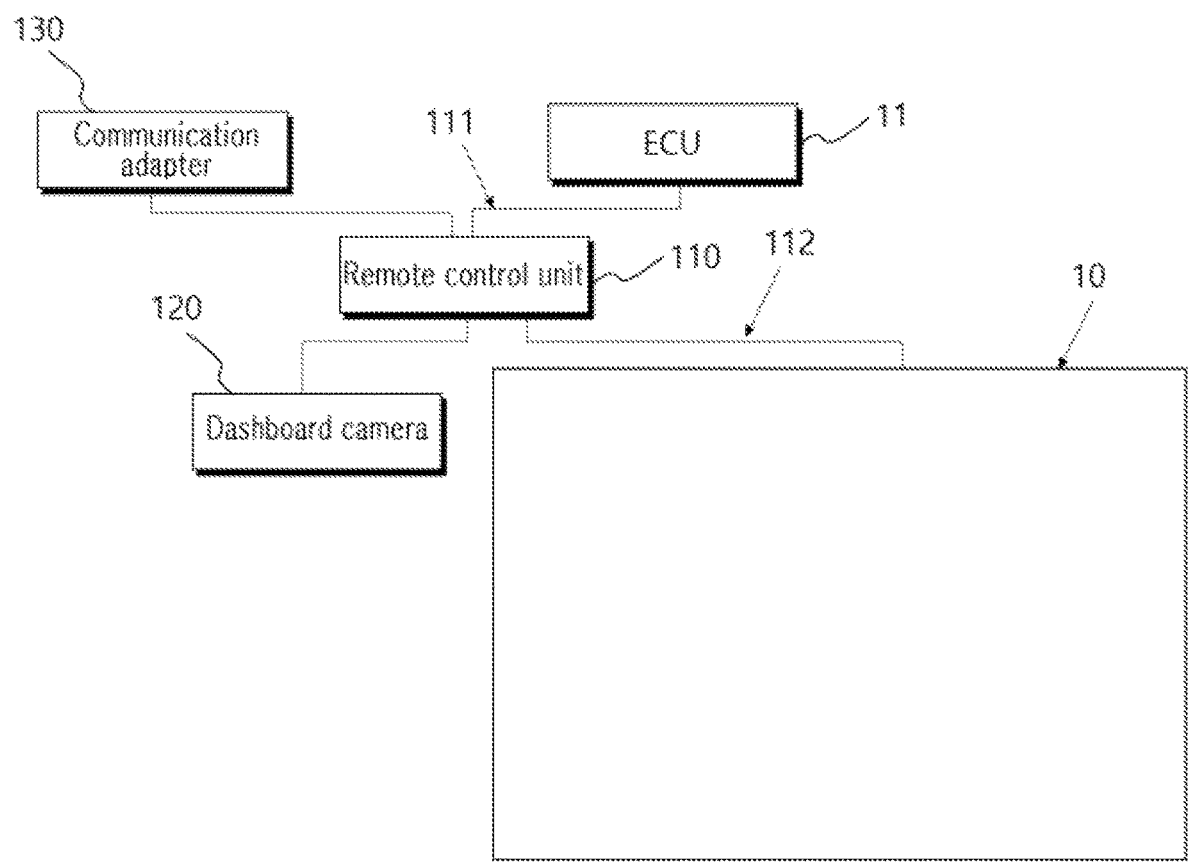
FIG. 2 is a network configuration view showing a remote control unit connected to an internal communication network of a vehicle.

As shown in FIG. 2, an ECU 11 is connected to an internal communication network 10 of the vehicle. At this point, preferably, it may be configured such that the remote control unit 110 disconnects the direct connection between the ECU 11 and the internal communication network 10, and connects the ECU 11 to the internal communication network 10 by way of the remote control unit 110.

A first connection line 111 connects the ECU 11 and the remote control unit 110, and a second connection line 112 connects the remote control unit 110 and the internal communication network 10.

Here, the internal communication network 10 of the vehicle to which the remote control unit 110 is connected may be various network types such as a local interconnect network (LIN), a controller area network (CAN), a CAN flexible data rate (CAN-FD), FlexRay, a media-oriented systems transport (MOST), vehicle Ethernet, and the like.

The remote control unit 112 may be installed to be separate from the vehicle's original electronic equipment by tapping the vehicle's electronic wire, and may be connected to a separate communication adapter 130 and a dashboard camera 120.

The communication adapter 130 and the dashboard camera 120 are not connected to the internal communication network 10 of the vehicle, and connected to the remote control unit 110 in a wired or wireless manner.

On the other hand, the remote control unit 112 acquires images of the inside of the vehicle using an internal camera embedded in the dashboard camera 120, and transfers information on the driver's driving habits or the like to the server unit through the communication adapter 130 according to a wireless communication specification of 5G or the like.

Here, the information transmitted by the remote control unit to the server unit is vehicle state information and may include some or all of the information related to the vehicle state that can be collected through the vehicle inter communication network, such as vehicle start state information, door locking state information, temperature inside the vehicle, and the like.

In addition, the information transmitted to the server unit may include collision detection event information, indoor image information and the like detected by the dashboard camera mounted on the vehicle.

The driver terminal performs a function of transmitting information for predicting driver's behavior including the driver's location information to the server unit, and executing a received active service proposal.

It is preferable that the driver terminal is a driver's mobile smart device, such as a smartphone, a tablet computer, or a laptop computer.

Here, the information for predicting driver's behavior may be in the form of big data, and some or all of the information on the driver's behavior of using the smart device may be transmitted to the server. For example, the information may include a time of using the terminal by the driver, a time point of using the terminal, a location of using the terminal, a distance moved while possessing the terminal, and the like.

The server unit receives the information transmitted from the remote control unit and the driver terminal, and determines and controls whether or not to provide an active service based on the information.

Figure 3:
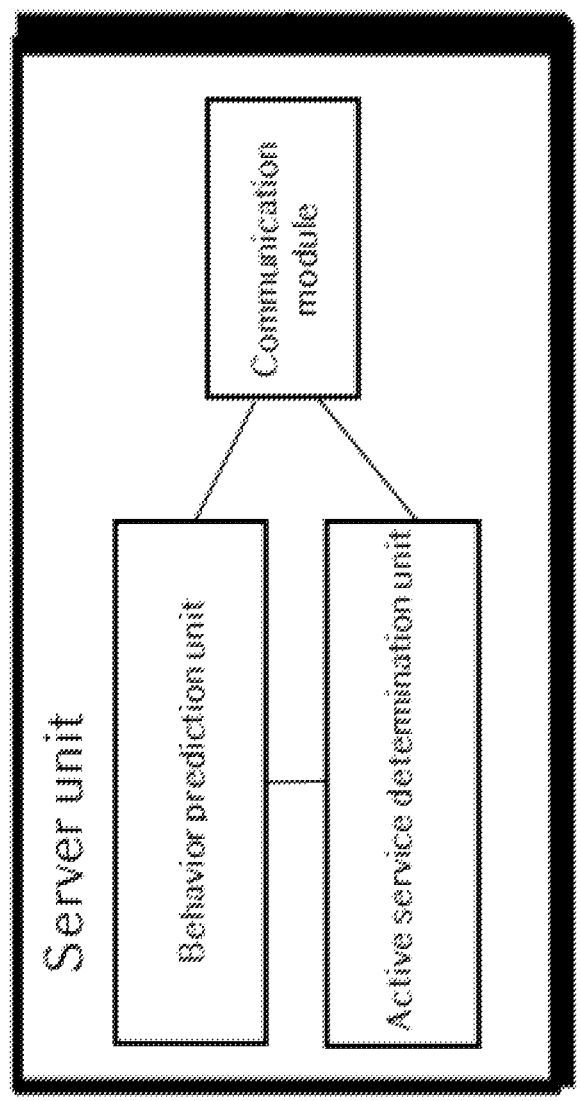
FIG. 3 is a block diagram showing the configuration of a server unit.

FIG. 3 is a view schematically showing the configuration of the server unit, and the server unit may include a behavior prediction unit, an active service determination unit, and a communication module.

The behavior prediction unit predicts the possibility of performing a specific behavior of the driver based on the information for predicting the driver's behavior received through the user terminal, and derives a behavior prediction value by quantifying the possibility.

The active service determination unit may be executed when the behavior prediction value derived by the behavior prediction unit satisfies a preset condition.

As an embodiment, the preset condition may be set as a case where the behavior prediction value becomes larger than a preset threshold value, and that the behavior prediction value becomes larger than a preset threshold value means that the behavior prediction unit predicts that a behavior pattern of the driver will occur. Accordingly, the active service determination unit is executed to determine whether or not to provide an active service to the driver through a determination algorithm based on the vehicle state information received from the vehicle remote control unit.

The description through a specific embodiment will be described below in the process of providing an active service according to the present invention.

Hereinafter, the process of providing an active service according to the present invention through the above components will be described with reference to FIG. 4.

Figure 4:
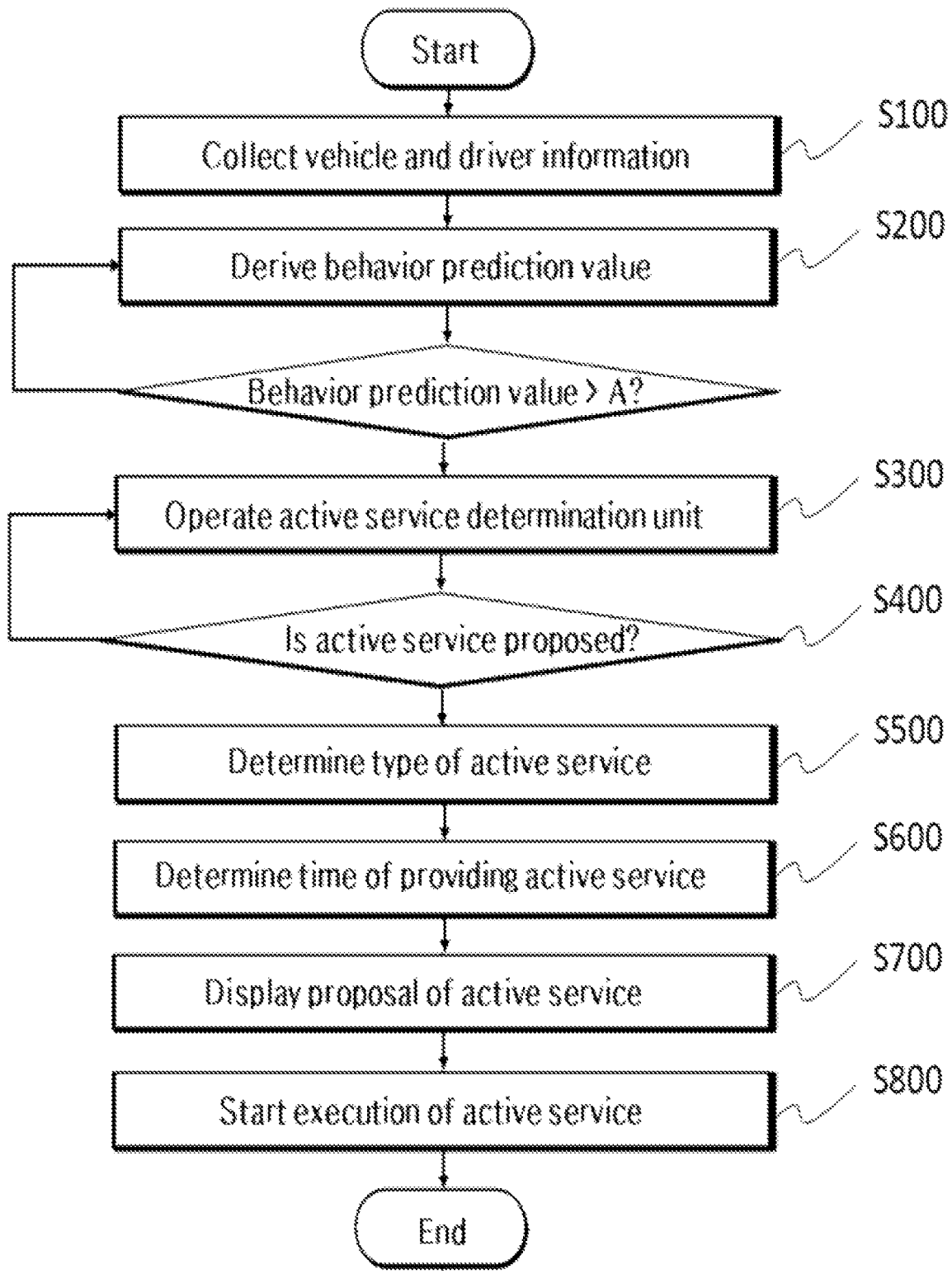
FIG. 4 is a flowchart illustrating a method of providing active services based on big data using a remote start device of a vehicle according to the present invention.

In FIG. 4, step 1 is a step of collecting information related to a vehicle and a driver (S100), in which information related to the vehicle is collected by the vehicle remote control unit, and information related to the driver is collected by the user terminal, and the information is transmitted to the server unit through wireless communication.

Step 2 is a step of deriving a behavior prediction value for predicting driver's behavior based on the collected information (S200).

The behavior prediction value is derived by the behavior prediction unit.

As an embodiment, the driver terminal is located in the same specific location range in the same specific visual range and may derive a behavior prediction value in a way of patterning repeated generation of information located in another same location range after a time has passed within the same specific time range, assigning an initial value of a specific behavior prediction value to the pattern, confirming whether the pattern matches in real-time, and increasing the behavior prediction value each time the pattern is repeated.

Describing a specific example thereof, when a driver repeats every week a behavior of departing from Namdong-gu in Incheon at around 7 a.m. on Monday and arriving at Samseong-dong in Seoul at around 9 a.m., time and location information with respect to the behavior is transmitted to a server every week, and when the number of times of transmitting the same information exceeds a preset threshold, the behavior prediction unit patterns this information and assigns an initial value, and a behavior prediction value is derived in a method of assigning a weighting value each time the behavior is repeated.

Step 3 is a step of operating the active service determination unit that determines whether or not to propose an active service when the derived behavior prediction value meets a preset condition (S300).

The preset condition may be a condition of being equal to or greater than a preset threshold, and when the preset condition is not achieved, it is determined again whether the behavior prediction value satisfies the condition, and when the preset condition is achieved, the active service determination unit that determines whether or not to propose an active service is executed.

Describing a specific example thereof, when the behavior prediction value exceeds a threshold value, the behavior prediction unit determines a case where the driver departs from Namdong-gu in Incheon at around 7 a.m. on Monday and moves to Samseong-dong in Seoul as a predicted situation, and the active service determination unit is executed.

Step 4 is a step of determining a proposal of an active service to a driver based on the collected vehicle-related information by the active service determination unit (S400).

In an embodiment, the active service determination unit may determine whether or not to propose an active service to the driver by integrating information on the current start state of the vehicle, location information, and environment information received from the vehicle remote control unit.

Describing a specific example thereof, in the above case, it is determined to propose an active service only when the current location of the vehicle is Namdong-gu in Incheon, and not to propose an active service when the current location of the vehicle is not Namdong-gu in Incheon or the current time is not around 7 a.m. on Monday.

Meanwhile, the active service determination unit may not determine proposal of a service by grasping a factor that makes an active service impossible according to combination of the current state of the vehicle and environment information at the current location.

In an embodiment, the active service determination unit collects information on the fine dust level at the current location of the vehicle through big data, and does not determine proposal of an active service for vehicle start when the fine dust level is higher than or equal to a predetermined level.

The fine dust level, which functions as a reference, may be set to a level prescribed by a government organization or the like, and in this case, violation of fine dust regulation can be prevented although a driver does not specially pay attention to the fine dust level.

In still another embodiment, since the active service determination unit does not determine proposal of an active service for vehicle start to the driver when the current location of the vehicle is near a green zone such as a park, a forest or the like, an eco-friendly function for reducing air pollution near the green zone caused by idling can be implemented.

In addition, the active service determination unit may grasp an active service restriction enforcement factor according to combination of the current state of the vehicle and the environment information at the current location, and determine the active service to operate in a limited manner.

In an embodiment, since the time required for preheating the engine when a vehicle is parked in an underground parking lot is shorter than the time required when the vehicle is parked outside, there is an effect of reducing fuel consumption and air pollution by reducing the preheating time.

When a vehicle is parked underground, current GPS information of the vehicle is not received, and only the last GPS information is recorded. Therefore, when the active service determination unit recognizes this situation and determines that the vehicle is parked underground, it may reduce the engine preheating time and propose an active service to the driver.

Step 5 is a step of determining a type of the proposed active service (S500).

This step is a step of determining a type of a service that is determined to be most suitable for the driver based on current state information of the vehicle collected by the active service determination unit.

As an embodiment, when the driver's behavior is predicted as moving in the behavior pattern predicted by the behavior prediction value, the active service determination unit may confirm information on the current start state of the vehicle, and propose operation of remote start to the driver as an active service when the engine is turned off. In another case, when the temperature inside the vehicle is low although the engine is turned on, the active service determination unit may remotely propose operation of the vehicle heater to the driver as an active service.

Describing a specific example thereof, in the case described above, when it is predicted by the behavior prediction unit that the driver departs from Namdong-gu in Incheon at around 7 a.m. on Monday and moves to Samseong-dong in Seoul, the active service determination unit may grasp the current start state information and the indoor temperature information of the vehicle, determine operation of remote start when the engine is turned off and operation of the indoor air conditioner when the engine is turned on, and propose the operations to the driver.

Step 6 is a step of determining an operation time of the proposed active service (S600).

The above step is a step of determining an operation time when the vehicle function is performed by the proposed active service.

As an embodiment, when it is desired to raise the current temperature inside the vehicle to a target temperature before the driver rides the vehicle, an operation time of the air conditioner may be determined considering the current temperature inside the vehicle, the efficiency of the air conditioner, the distance between the vehicle and the driver, and the driver's moving speed.

Figure 5:
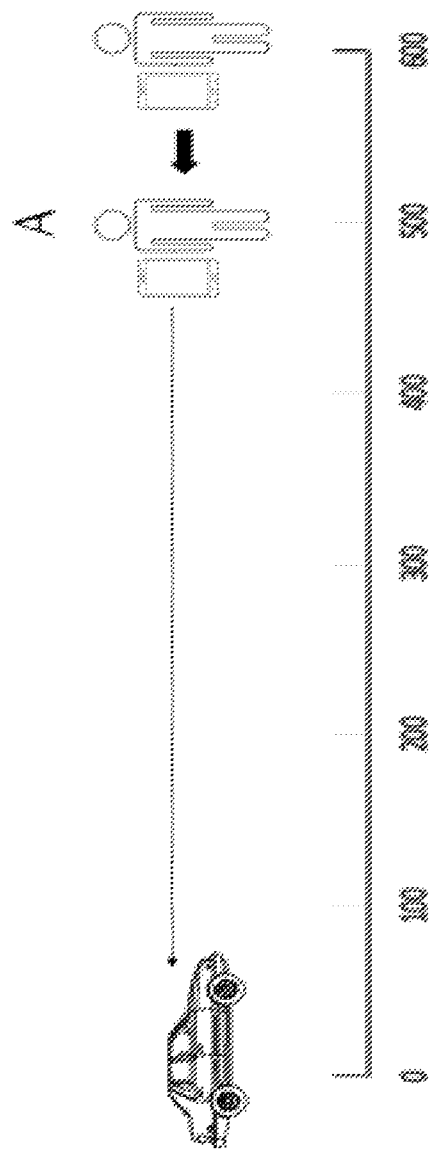
FIG. 5 is a view showing a process of determining a time for providing an active service when the active service is provided.

FIG. 5 is a view showing a specific example thereof, and when the current temperature inside the vehicle is 5 degrees, the target temperature is 20 degrees, the output of the air conditioner increase 3 degrees per minute, the distance between the vehicle and the driver is 600 m, and the driver's moving speed is 100 m/s, the air conditioner is able to raise the temperature to the target temperature by operating for 5 minutes right before the driver rides the vehicle, and therefore, the active service determination unit determines an active service to operate the air conditioner for 5 minutes from the point A where the distance between the driver and the vehicle is 500 m, and when the driver reaches point A, it sends a signal to the remote control unit to operate the air conditioner.

Furthermore, when the proposed active service simultaneously or sequentially performs two operations, it may include a case of determining the operation time of the active service.

In an embodiment, in the case where a proposed active service is preheating the engine and operating the air conditioner, when only the air conditioner operates while the engine is turned off, power consumption of the vehicle battery increases greatly and causes a risk of discharge, and in the case of an electric vehicle, the air conditioner cannot operate when the engine is turned off, and therefore, it is desirable to operate the air conditioner after turning on the engine.

In this case, when it takes 3 minutes to preheat the engine and 2 minutes to raise the temperature inside the vehicle to a target temperature, the operation time of the active service is determined in a way of starting the engine first and operating the air conditioner 1 minute later.

Step 7 is a step of transmitting and displaying proposal of the determined active service on the driver terminal (S700).

In this step, the server may transmit the active service proposal determined by the active service determination unit to the driver terminal to be displayed on the driver terminal so that the driver may confirm the proposed service and determine whether or not to perform the proposed service.

Step 8 is a step of starting execution of the determined active service (S800).

In this step, considering the level of technique in the corresponding technical field, a case where the driver approves execution of an active service by touching an active service proposal icon or button displayed on the driver terminal is naturally included.

Furthermore, although there is no explicit selection of the driver as described above, it is possible to detect a change in the state of the driver terminal and start execution of an active service.

As an embodiment, the change in the state of the driver terminal may include a change in the air pressure detected by an air pressure sensor and a mobile communication strength of the driver terminal.

After the active service determined by the active service determination unit is proposed to the driver terminal, when a change in the air pressure detected by an air pressure sensor of the driver terminal and a state change of decrease in the strength of the mobile communication signal of the user terminal are detected at the same time, this is determined as a situation in which the driver is in an elevator and moving to the vehicle, and execution of the proposed active service begins.

In addition, when a state change is detected as described above, the driver's behavior pattern is grasped and the starting point of executing the active service may be adjusted considering the behavior pattern, rather than starting execution of the active service immediately.

For example, when it is general that the driver usually walks about 5 minutes to arrive at the vehicle after getting off the elevator, the active service is not immediately executed although the state change described above is detected through the user terminal, but when it is determined that the driver gets off the elevator by detecting that the strength of the mobile communication of the user terminal is the same as the strength before getting in the elevator, execution of the active service starts within 5 minutes from this point.

Furthermore, the driver's behavior may be collected as big data and used for proposal of active services.

In an embodiment, when the driver's behavior corresponds to 'movement', information on an app used by the driver through the driver terminal, the driver's arrival location, the time taken from departure to arrival, environmental information at the arrival location, and the like may be collected as big data, and more diverse active services may be provided to the driver on the basis of the big data.

Describing a specific example thereof, when 'airport' is registered as the destination in a schedule management app used by the driver, the driver terminal transmits this information to the server unit, and the behavior prediction unit may derive a behavior prediction value for the movement to the 'airport'.

When the derived value satisfies a preset condition and the active service determination unit operates, the active service determination unit may derive the distance to the airport or a predicted arrival time of the driver at the airport on the basis of information on the cases of the driver moving to the airport, which is collected as big data until the time point, and based on the big data, whether the current amount of fuel is sufficient is informed to the driver by calculating the amount of fuel required to move to the airport, weather forecast near the airport at the estimated time of arrival at the airport is informed to the driver in advance, or actions required for the weather, for example, installation of snow tires or snow spiders when snowfall is expected, may be informed to the driver in advance.

Since the present invention actively provides a service of performing a vehicle function based on collected information on a driver and a vehicle and big data, there is an advantage in that the driver may receive a proposal for operation of a most appropriate vehicle function according to a situation without the need of making a determination by himself or herself, and create an optimal driving environment in advance by remotely operating the function before the driver rides the vehicle.

In addition, since the present invention may provide an active service of an optimized form by combining a state of the vehicle and information on the surrounding environment in which the vehicle is located through the collected big data on the driver and the surrounding environment in which the vehicle is located, there is an advantage in that driver's convenience and eco-friendliness can be improved at the same time.

The technical spirit of the present invention has been described above through several embodiments.

It is apparent that those skilled in the art may diversly modify or change the embodiments described above from the description of the present invention. In addition, although not explicitly shown or described, it is apparent that those skilled in the art may make modifications of various forms including the technical spirit of the present invention from the description of the present invention, and this still belongs to the scope of the present invention. The embodiments described above with reference to the accompanying drawings are described for the purpose of describing the present invention, and the scope of the present invention is not limited to these embodiments.

What is claimed is:

1. An active service providing method for remotely controlling a vehicle based on big data using a remote start device of the vehicle, the method comprising the steps of:
   collecting information related to the vehicle and a driver;
   deriving a behavior prediction value for predicting driver's behavior based on the collected information;
   operating an active service determination unit that determines whether or not to propose an active service when the derived behavior prediction value meets a preset condition;
   determining, by the active service determination unit, proposal of an active service to the driver based on the collected vehicle-related information;
   determining a type of the proposed active service;
   determining a time of providing the proposed active service;
   transmitting proposal of the determined active service to a driver terminal to be displayed; and
   starting execution of the determined active service according to a change in a state of the driver terminal.

2. The method according to claim 1, wherein at the step of deriving a behavior prediction value, the behavior prediction value is derived by matching information on a driver's behavior pattern in each time slot with information on a driver's behavior pattern at each location.

3. The method according to claim 1, wherein at the step of determining, by the active service determination unit, proposal of an active service to the driver based on the collected vehicle-related information, the collected vehicle-related information includes current state information of the vehicle, current location information of the vehicle, and environmental information at the current location of the vehicle.

4. The method according to claim 1, wherein at the step of determining a time of providing the proposed active service, a time for providing the proposed active service is determined by combining a difference between the collected current state information of the vehicle and a target state information of the vehicle with information on a distance between a current location of the driver and the vehicle.

5. The method according to claim 1, wherein at the step of starting execution of the determined active service according to a change in a state of the driver terminal, the state change includes a change in a pressure value of a pressure sensor of the driver terminal and a change in a strength value of wireless signal.

6. A remote vehicle control system for providing active services based on big data using a remote start device of a vehicle, the system comprising:
   a remote control unit connected to a vehicle internal communication network to collect and transmit vehicle-related information and perform remote control of the vehicle;
   a driver terminal for collecting driver-related information and displaying proposal of an active service; and
   a server unit for receiving the information from the remote control unit and the driver terminal and proposing an active service to the driver based on the information, wherein
   the server unit includes:
   a behavior prediction unit for deriving a behavior prediction value for predicting driver's behavior based on the information collected from the user terminal; and
   an active service determination unit that is executed when the behavior prediction value derived by the behavior prediction unit satisfies a preset condition to determine an active service.

* * * * *